Oct. 9, 1951 A. O. WILLIS 2,570,622
AIRCRAFT ENCLOSURE OPERATING MEANS
Filed Dec. 13, 1947 2 Sheets-Sheet 1
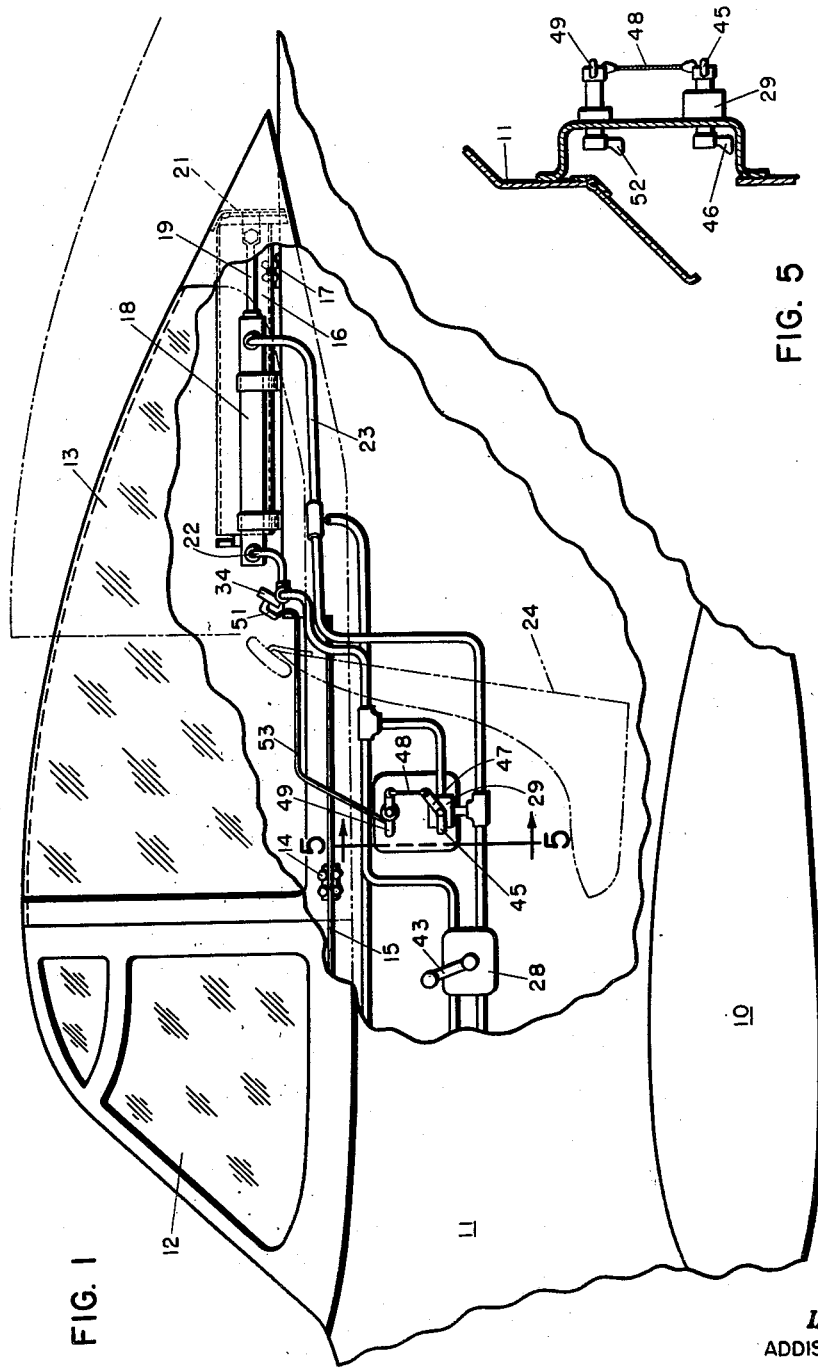
INVENTOR.
ADDISON O. WILLIS
BY
Richard W. Treverton
ATTORNEY.

Oct. 9, 1951 A. O. WILLIS 2,570,622
AIRCRAFT ENCLOSURE OPERATING MEANS
Filed Dec. 13, 1947 2 Sheets-Sheet 2

INVENTOR.
ADDISON O. WILLIS
BY
Richard W. Treverton
ATTORNEY.

Patented Oct. 9, 1951

2,570,622

UNITED STATES PATENT OFFICE 2,570,622

AIRCRAFT ENCLOSURE OPERATING MEANS

Addison O. Willis, Columbus, Ohio, assignor to Curtiss-Wright Corporation, a corporation of Delaware Application December 13, 1947, Serial No. 791,489

7 Claims. (Cl. 121—38)

This invention relates to aircraft cabin enclosures and particularly to operating means for such enclosures.

In certain types of military airplanes a sliding enclosure is usually provided for the cabin, and it is customary for the pilot to have it open during take-off and landing to facilitate his egress in case of accident. With the advent of heavier aircraft constructions and higher operating airspeeds, greater forces have been required to move such an enclosure or canopy between opened and closed positions with the result that various mechanical arrangements have been provided for this purpose, most of them including a manually operated crank which is geared or otherwise connected with the movable canopy in a manner to provide a mechanical advantage.

The present invention provides power operating means for the canopy which include a control element operable by an occupant of the cabin to effect either opening or closing movement of the canopy. There are also included release means, operable either from the inside or from the outside of the cabin, which serve to so release the power means that the canopy may be operated manually. This is desirable at times when the power means are inoperative for any reason, and, as to operation of the release means from the outside, may be of considerable value in the event a cabin occupant is injured or is otherwise incapacitated. The system further includes emergency power operating means for opening the canopy in case of failure or inadequacy of the primary source of power. The emergency means are important for the reason that in case of damage to the airplane abnormally large forces may be required to open the canopy, and for the further reason that under such circumstances the occupant may be injured and unable to apply even the amount of force that is usually necessary for manual opening of the canopy.

In the preferred embodiment of the invention the canopy is operated between opened and closed positions by a fluid motor whose primary source of power is hydraulic pressure provided by an engine operated pump. The fluid motor is controlled for normal operation in either direction by a reversible valve, and a by-pass valve is provided in its hydraulic circuit to enable manual operation of the canopy in case of failure of the primary pressure source. For emergency power operation to open the canopy a source of compressed air is provided. An interconnection is arranged between an emergency valve that is provided for opening the compressed air line and the by-pass valve so that the latter will be opened automatically upon opening of the emergency valve. This interconnection prevents hydraulic liquid in the system from being entrapped and locking the motor against emergency operation.

The foregoing and other objects and advantages will become apparent from the following description of the preferred embodiment of the invention shown in the accompanying drawings, wherein:

Figure 1 is a side elevational view of an airplane cabin, with parts broken away to reveal the internal construction;

Figure 5 is a sectional view taken along line 5—5 of Figure 1.

Figure 2:
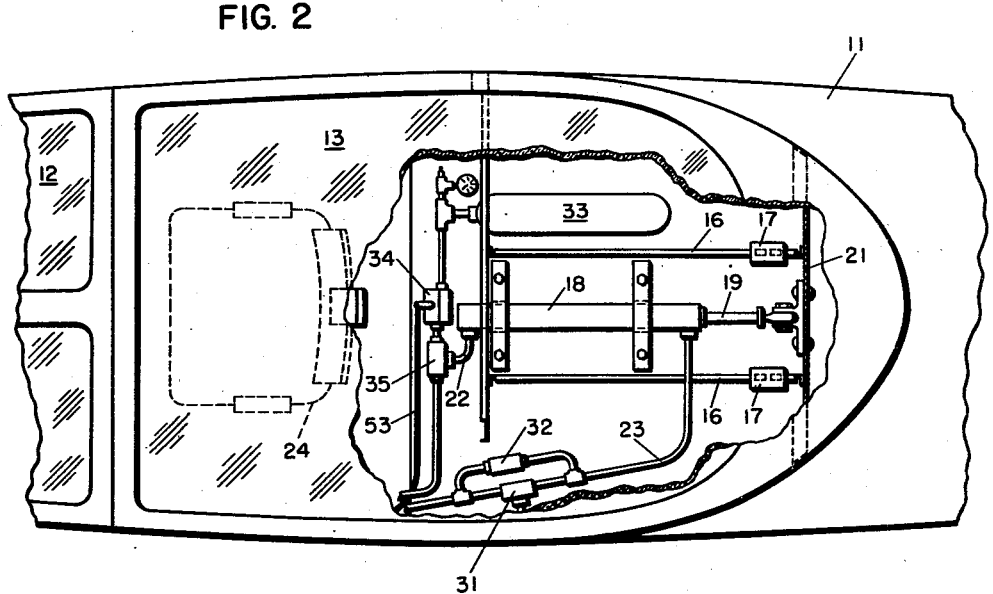
Figure 2 is a plan view of the structure shown in Figure 1 and also having certain portions broken away.

The airplane shown in the drawings as having wing 10 and fuselage 11 is provided with a cockpit enclosed by a windshield 12 and a canopy 13 that is slidable between the closed position shown in full lines in Figure 1, and the open position indicated by broken lines. The details of the sliding support means for the canopy are not a part of this invention, but if desired they may be generally of the kind shown in the co-pending application of Lawrence F. Santucci and Joseph S. Showalter, Serial No. 614,058, filed September 1, 1945, for improvements in Aircraft Construction, now Patent No. 2,544,397. This kind of support means, as shown in Figures 1 and 2 of the drawings of the present disclosure, comprises rollers 14 mounted on the forward portion of the canopy and arranged to travel along tracks 15 that are affixed to the fuselage and extend along the sills of the cockpit, and further comprises track rails 16 carried by the rear portion of the canopy and supported by rollers 17 that are mounted upon the fuselage 11.

The motor for operating the canopy between opened and closed positions comprises a cylinder and piston unit, of which the cylinder, designated 18, is secured to the fuselage while the piston rod, 19, is connected to a transverse member 21 of the canopy. A fluid conduit 22 is connected to the forward end of the cylinder while another fluid conduit 23 is connected to its opposite end. As shown in Figures 1 and 2 the motor may be disposed between the track rails 16 and aft of the portion of the cockpit space which contains the pilot's seat 24.

Figure 4:
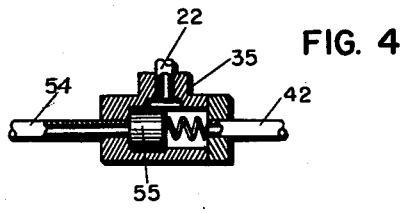
Figure 4 is a sectional view of a valve that is shown in Figure 3.

For normally operating the motor there are fluid conduits extended from a hydraulic system of the airplane which may comprise an hydraulic fluid reservoir 25, a pump 26 driven by the airplane's engine (not shown), and a pressure accumulator 27. Associated with these conduits are a reversible control valve 28, a by-pass valve 29, a pressure reducing valve 31, and check valve 32. To enable emergency power operation there are also provided a compressed air cylinder 33, a compressed air shut-off valve 34 and a shuttle valve 35, the latter being shown in section in Figure 4. Associated with the compressed air cylinder is an air filler valve 36 and a pressure gage 37.

The reversible valve 28 which controls the motor unit in normal operation has a pressure inlet port connected to a conduit 38 which communicates with the accumulator 27 and extends from the outlet side of pump 26; and a return outlet port connected by a return line 39 to reservoir 25. Conduits designated 41 and 42 extend from two ports of valve 28, each of which is either a pressure outlet port or a pressure inlet port depending upon the position of the valve as set by valve control handle 43. In the forward position of handle 43 conduit 41 is connected to the pressure outlet port of the valve, i. e. is connected through the valve with pressure conduit 38, while conduit 42 is connected to the return inlet of valve 28, i. e. with return line 39. In the rearward position of the valve handle these connections are reversed, conduits 38 and 42 being connected together, and conduits 39 and 41 being connected together.

Conduit 42 communicates through the shuttle valve 35 with conduit 22, while conduit 41 communicates with conduit 23 through reducing valve 31 which serves to limit to a predetermined maximum value the pressure applied to the motor in a direction to close the canopy. The purpose of this reducing valve is to prevent possible serious injury to the pilot in the event any portion of his body should be disposed between the edges of windshield 12 and canopy 13 while the latter is closing under hydraulic pressure. A vent line 44 extends from the reducing valve to the return line 39 to allow return of seepage to the reservoir. Connecting the conduits 23 and 41 in by-passing relation to the reducing valve is check valve 32. Its purpose is to allow return flow of fluid from the cylinder 18 around the reducing valve when the canopy is being operated to opened position.

The valve 29 is arranged in a by-passage between conduits 41 and 42. It is normally closed but may be opened manually either by a lever 45 that is disposed accessibly to the pilot within the cockpit or by a lever 46 accessible from the outside of the airplane. An extension 47 of lever 45 is connected by a flexible cable 48 to an emergency lever 49 for operating the valve 34. The cable connection causes valve 29 to be opened simultaneously with opening of valve 34. However the cable constitutes a play connection so that valve 34 will not be moved when valve 29 is opened by manual operation of lever 45 or of lever 46. Valve 29 is a three-way valve, and when open places conduits 41 and 42 in communication with each other and also with a vent line 44' which communicates with return line 39.

The valve 34 is in the passage 54 between cylinder 33 and valve 35, and it is provided with a lever 51 that is connected by a flexible cable 53 to the emergency lever 49. This lever is located in a position readily accessible to the pilot and it has an extension 52 to the outside of the airplane so the valve 34 may be moved to open the canopy by power in emergencies in case the cockpit is unoccupied or the person in the cockpit is incapacitated.

The shuttle valve 35 has a valve chamber into which open conduits 22 and 42 and also a conduit 54 which extends to valve 34. In the chamber is a spring biased piston valve 55 which normally closes conduit 54 but allows free fluid communication between conduits 22 and 42. In case of emergency, when valve 34 is opened, fluid from the alternate or emergency pressure source 33 will overcome the spring bias and shift valve 55 to a position closing passage 42 and opening fluid communication between conduit 54 and conduit 22.

Figure 3:
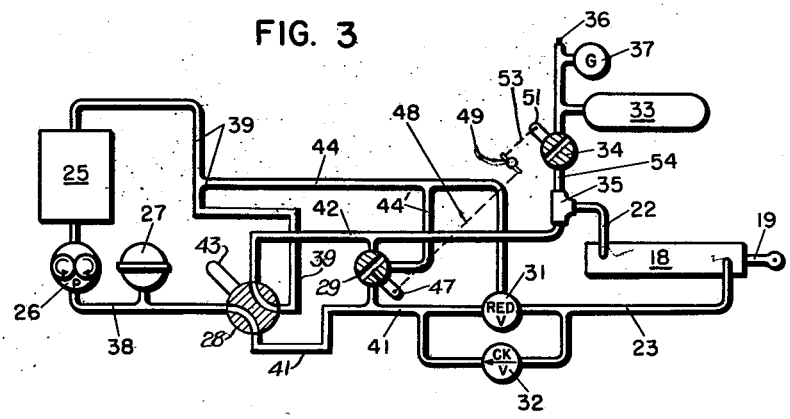
Figure 3 is a diagrammatic illustration of the hydraulic system.

It will now be apparent that with pump 26 in operation or pressure available in accumulator 27, forward movement of valve lever (to the left in Figure 3) 42 will normally result in closing movement of the canopy. In this normal operation fluid under pressure will pass from conduit 38 through control valve 28, conduit 41, reducing valve 31, and conduit 23 to cylinder 18; and return fluid will pass from cylinder 18 through conduit 22, shuttle valve 35, conduit 42, control valve 28 and return line 39 to a reservoir 25. Similarly rearward movement of lever 43 will cause a reverse fluid flow to open the canopy. From pressure line 38, control valve 28, conduit 42, shuttle valve 35, and conduit 22 to the cylinder 18, with return flow from the latter via conduit 23, check valve 32, conduit 41, and control valve 28 to return line 39 and reservoir 25.

To enable manual operation of the canopy in either direction the by-pass valve 29 is opened by manual movement of lever 45 or lever 46, counterclockwise in Figure 1, to open position. This enables free movement of piston rod 19 accompanied by circulation of fluid from one end of cylinder 18 to the opposite end thereof, the circulatory path including conduits 22, valve 35, conduit 42, valve 29, and conduits 41 and 23. Since by reason of the piston rod the displacement of the aft end of the cylinder is somewhat less than that of the front end, fluid will exhaust from this circulatory path through conduit 44' as the canopy is manually closed and enter from conduit 44' as the canopy is opened.

During emergency power opening of the canopy, effected by opening of valve 34 through movement of lever 49 or its extension 52 (in a counterclockwise direction as viewed in Figure 1), the valve 29 will be opened so that fluid may exhaust from the aft end of cylinder 18 via conduit 23, check valve 32, conduit 41, valve 29, and conduits 44' and 39 to reservoir 25.

It will be understood that the canopy operating means herein described represents only one preferred embodiment of the inventive principles involved and that these principles may be otherwise embodied without departing from the spirit of the invention or from the scope of the appended claims.

I claim:

1. Operating means for an aircraft cabin movable closure member; said operating means comprising a fluid motor having a stationary cylinder and a movable piston rod connected with the closure member, a primary source of fluid pressure and a fluid reservoir therefor, a control valve having a pressure inlet from said source and a return outlet to said reservoir, the control valve having ports connected to first and second conduits which are respectively connected to opposite ends of the cylinder, the control valve being reversible to connect either one of said conduits with said pressure inlet and the other thereof with said return outlet, the first conduit being connected with said pressure inlet to operate the motor for closing the closure member and the second conduit being connected with said pressure inlet to operate the motor for opening the closure member, a pressure reducing valve in said first conduit to limit the force applied by the motor in closing the closure member, a passage around said pressure reducing valve containing a check valve arranged to open in the presence of return flow in the first conduit, a by-pass valve arranged when open to place said conduits in communication with each other and with said reservoir for enabling manual operation of the closure member, a secondary source of pressure, a shuttle valve connecting said secondary source to said second conduit to provide for emergency operation of the motor to open the closure member, said shuttle valve during such emergency operation closing communication through the second conduit between the control valve and the cylinder, an emergency valve for controlling said secondary source and disposed between the latter and said shuttle valve, and a play connection between the emergency valve and said by-pass valve for opening the latter upon opening of the emergency valve and for permitting operation of the by-pass valve independently of the emergency valve when the latter is closed.

2. Operating means for an aircraft cabin movable closure member; said operating means comprising a fluid motor having a stationary cylinder and a movable piston rod connected with the closure member, a primary source of fluid pressure and a fluid reservoir therefor, a control valve having a pressure inlet from said source and a return outlet to said reservoir, the control valve having ports connected to first and second conduits which are respectively connected to opposite ends of the cylinder, the control valve being reversible to connect either one of said conduits with said pressure inlet and the other thereof with said return outlet, the first conduit being connected with said pressure inlet to operate the motor for closing the closure member and the second conduit being connected with said pressure inlet to operate the motor for opening the closure member, a by-pass valve so arranged that when it is opened said conduits are placed in communication with each other and with said reservoir for enabling manual operation of the closure member, a secondary source of pressure, a shuttle valve connecting said secondary source to said second conduit to provide for emergency operation of the motor to open the closure member, said shuttle valve during such emergency operation closing communication through the second conduit between the control valve and the cylinder, an emergency valve for controlling said secondary source and disposed between the latter and said shuttle valve, and a play connection between the emergency valve and said by-pass valve for opening the latter upon opening of the emergency valve and for permitting operation of the by-pass valve independently of the emergency valve when the latter is closed.

3. Operating means for an aircraft cabin movable closure member; said operating means comprising a fluid displacement motor for operating the closure member between opened and closed positions, a primary source of fluid pressure and a return system therefor, a control valve having a pressure inlet from said source and a return outlet to said return system, the control valve having ports connected to first and second conduits which are respectively connected to opposite sides of the motor, the control valve being reversible to connect either one of said conduits with said pressure inlet and the other thereof with said return outlet, the first conduit being connected with said pressure inlet to operate the motor for closing the closure member and the second conduit being connected with said pressure inlet to operate the motor for opening the closure member, a by-pass valve so arranged that when it is opened said conduits are placed in communication with each other and with said return system for enabling manual operation of the closure member, a secondary source of pressure, a shuttle valve connecting said secondary source to said second conduit to provide for emergency operation of the motor to open the closure member, said shuttle valve during such emergency operation closing communication through the second conduit between the control valve and the cylinder, an emergency valve for controlling said secondary source and disposed between the latter and said shuttle valve, and a play connection between the emergency valve and said by-pass valve for opening the latter upon opening of the emergency valve and for permitting operation of the by-pass valve independently of the emergency valve when the latter is closed.

4. Operating means for an aircraft cabin movable closure member; said operating means comprising a fluid displacement motor for operating the closure member between opened and closed positions, a primary source of fluid pressure and a return system therefor, a control valve having a pressure inlet from said source and a return outlet to said return system, the control valve having parts connected to first and second conduits which are respectively connected to opposite sides of the motor, the control valve being reversible to connect either one of said conduits with said pressure inlet and the other thereof with said return outlet, the first conduit being connected with said pressure inlet to operate the motor for closing the closure member and the second conduit being connected with said pressure inlet to operate the motor for opening the closure member, a by-pass valve in a passage connecting said conduits, said by-pass valve when opened enabling manual operation of the closure member, a secondary source of pressure to provide for emergency operation of the motor to open the closure member, an emergency valve for controlling passage of fluid from the secondary source to the second conduit, and a play connection between the emergency valve and said by-pass valve for opening the latter upon opening of the emergency valve and for permitting operation of the by-pass valve independently of the emergency valve when the latter is closed.

5. Operating means for an aircraft cabin movable closure member; said operating means comprising a fluid displacement motor for operating the closure member between opened and closed positions, a primary source of fluid pressure and a return system therefor, a control valve having a pressure inlet from said source and a return outlet to said return system, the control valve being connected to first and second conduits which are respectively connected to opposite sides of the motor, the control valve being reversible to connect either one of said conduits with said pressure inlet and the other thereof with said return outlet, the first conduit being connected with said pressure inlet to operate the motor for closing the closure member and the second conduit being connected with said pressure inlet to operate the motor for opening the closure member, a by-pass valve in a passage connecting said conduits, said by-pass valve when opened enabling manual operation of the closure member, a secondary source of pressure for emergency operation of the motor to open the closure member, an emergency valve for opening or closing communication between the secondary source and the second circuit, and means for opening said by-pass valve by and upon opening of said emergency valve.

6. Operating means for an aircraft cabin movable closure member; said operating means comprising a primary source of power, reversible control means for applying power from said source to the closure member for moving it in either direction between the opened and closed positions thereof, release means operable to free the closure member from the means for applying power thereto whereby the closure member may be manually moved between its opened and closed position, a second source of power, and means for applying power from said second source to the closure member for opening the latter and simultaneously effecting operation of said release means.

7. Operating means for an aircraft cabin movable closure member; said operating means comprising a primary source of power; reversible first control means for effecting application of power from said source to the closure member for moving said closure member in either direction between the open and closed positions of said closure member, release means operable to free the closure member from said first control means so that the closure member may be moved manually, a second source of power; second control means operable for effecting application of power from said second source to said closure member for opening said closure member, and means providing a play connection between said release means and said second control means for operating said release means upon operation of said second control means and for permitting operation of said release means independently of said control means.

ADDISON O. WILLIS.

REFERENCES CITED

The following references are of record in the file of this patent:

UNITED STATES PATENTS

| Number | Name | Date |
|---|---|---|
| 1,115,605 | Snohr | Nov. 3, 1914 |
| 1,652,623 | Hedley et al. | Dec. 13, 1927 |
| 1,828,643 | Cannon | Oct. 20, 1931 |
| 1,919,443 | McCune | July 25, 1933 |
| 1,947,727 | McCune | Feb. 20, 1934 |
| 2,127,877 | Maglott | Aug. 23, 1938 |
| 2,350,229 | Harrington | May 30, 1944 |
| 2,365,700 | Heigis | Dec. 26, 1944 |
| 2,406,173 | Stephens | Aug. 20, 1946 |
| 2,416,097 | Hansen | Feb. 18, 1947 |

FOREIGN PATENTS

| Number | Country | Date |
|---|---|---|
| 444,130 | Great Britain | Aug. 9, 1935 |
| 376,691 | Italy | Nov. 22, 1939 |